Aug. 16, 1938.　　　R. H. FAY　　　2,127,250

COOKING UTENSIL HANDLE

Filed Jan. 22, 1937

Inventor
R. H. Fay —
By
Attorneys

Patented Aug. 16, 1938

2,127,250

UNITED STATES PATENT OFFICE 2,127,250

COOKING UTENSIL HANDLE

Ray H. Fay, Manitowoc, Wis., assignor to Aluminum Goods Manufacturing Co., Manitowoc, Wis.

Application January 22, 1937, Serial No. 121,779

2 Claims. (Cl. 16—114)

This invention appertains to handles for cooking utensils, and more particularly to novel means for securing a handle to a coffee percolator, or similar utensil.

In coffee percolators, it is generally the custom to provide a wooden handle, so that the percolator can be easily manipulated without danger of the user's hands being burned. The space between the upper and lower brackets is generally limited, due to the wood bushings or sleeves surrounding the bolts employed for holding the handle of the percolator, which prevents an easy grip being had on the handle.

It is, therefore, one of the salient objects of the invention to provide a handle embodying a wooden handle, with a novel means for anchoring the extreme lower end of the same to the percolator body by means of a metal strap, whereby ample space will be provided between the upper bracket and the lower strap for the hand.

Another salient object of my invention is to provide a durable and simple means for detachably connecting the strap to the hand-grip, whereby the grip can be easily and quickly replaced when necessary, or desirable.

A further object of my invention is to provide novel means for forming the strap, whereby the same will underlie the hand-grip to form a protection therefor, and at the same time permit firm connection thereof to the grip.

A still further object of my invention is to provide a novel means for securing percolator handles in place of the above character, which will be simple and easy to manufacture, and one which can be placed upon the market and incorporated with a percolator at a small cost.

With these and other objects in view, the invention consists in the novel construction, arrangement, and formation of parts, as will be hereinafter more specifically described, claimed, and illustrated in the accompanying drawing, in which drawing:

Figure 1:
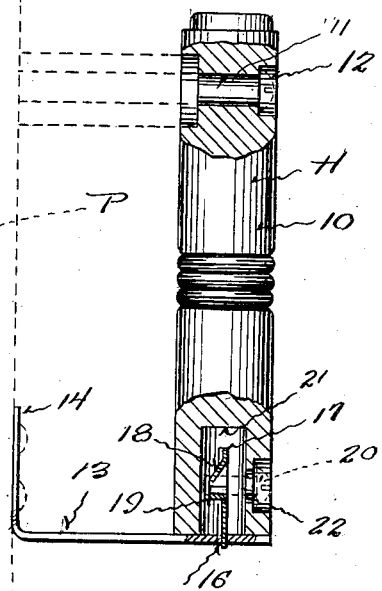
Figure 1 is a side elevation of a utensil handle constructed in accordance with my invention, parts of the handle being shown broken away and in section to illustrate the construction thereof.
Figure 2:
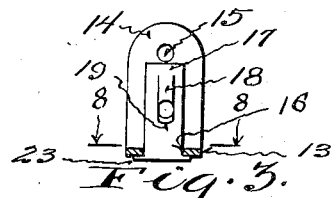
Figure 2 is a transverse section through the handle-securing means taken substantially on the line 2—2 of Figure 4, looking in the direction of the arrows.
Figure 3:
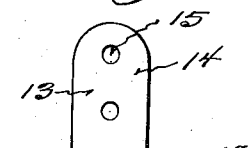
Figure 3 is an inner end elevation of the bracket or strap forming a part of the handle-securing means.

Referring to the drawing in detail, wherein similar reference characters designate corresponding parts throughout the several views, the letter H generally indicates a handle for a cooking utensil, such as a percolator P, shown in dotted lines in Figure 1 of the drawing. The handle H includes a wooden hand-grip 10, which can be ornamented in any desired way. The upper end of the hand-grip 10 can be secured to the percolator body in the manner now customarily practised, and thus the upper end of the grip can be provided with a diametrically extending opening 11 through which is inserted a holding bolt 12. The inner end of the bolt is adapted to be threaded into a socket carried by the percolator body, and the head of the bolt is countersunk within the hand-grip. A sleeve formed of wood, or other material, can be placed around the bolt between the percolator body and the hand-grip.

Figure 4:
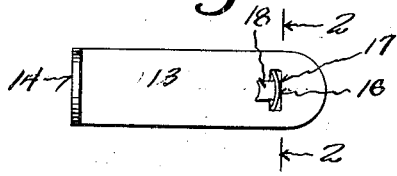
Figure 4 is a top plan view of the bracket or strap.

The lower end of the hand-grip is connected to the percolator body in a novel manner, and thus I utilize a metal strap or bracket 13, on which the lower end of the hand-grip is adapted to rest. The inner end of the strap or bracket 13 has formed thereon a right angularly extending attaching foot 14, having openings 15 therein by means of which the strap can be riveted to the percolator. The strap 13 adjacent to its outer end is provided with a transversely extending slot 16, through which is inserted an attaching clip 17. If desired, this attaching clip 17 can be transversely bowed, as best shown in Figure 4, so as to frictionally grip the walls of the slot. Struck out from the body portion of the clip are upper and lower ears 18 and 19, which form means for engaging the thread of an attaching screw 20 shown in dotted lines in Figure 1 of the drawing. The lower end of the hand-grip 14 has formed therein an axial bore 21 for receiving the clip, and communicating with the bore is a diametrically extending opening 22 for the reception of the screw 20, the head of which is adapted to be countersunk within the hand-grip.

In assembling the clip 17 with the strap, the same can be first inserted through the opening 16, after which the ears 18 and 19 can be punched therefrom, or the ears 18 and 19 can be punched from the clip before the assembling process. In this instance, the lower end of the clip is inserted through the slot 16, and the lower end of the clip is upset, as at 23.

The outer end of the strap or bracket is preferably rounded so as to conform to the configuration of the hand-grip 10. In connecting the hand-grip with the bracket or strap, the hand-grip is placed on top of the strap or bracket in such a manner that the clip 17 will extend into the bore 21, after which the screw 20 is placed through the opening 22, and threaded between the ears 18 and 19.

By this construction it can be seen that novel and simple means has been provided for connecting the wooden hand-grip with the percolator, and that the strap will form a protection for the lower end of the grip.

Figure 5:
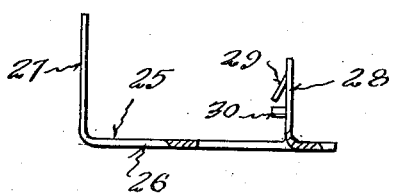
Figure 5 is a detail side elevation of a modified form of the bracket or strap, with parts thereof broken away and in section.

In Figure 5 I have shown a modified form of bracket or strap, and in this figure an angle-shaped bracket or strap 25 is provided, having a horizontal body portion 26 and a vertically extending attaching foot 27. Struck out from the body portion 26 of the strap or bracket is an upstanding ear 28, and this ear in turn has struck therefrom the upper and lower tongues 29 and 30, which are adapted to be engaged by the attaching screw. This bracket is utilized in the same manner as the bracket 13, and hence the ear 28 is inserted within the bore 21 of the hand-grip.

Figure 6:
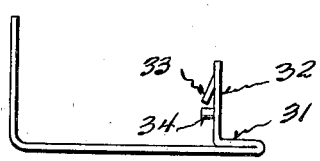
Figure 6 is a side elevation of a further modified form of the bracket or strap.

In lieu of punching the ear 28 from the body portion of the bracket or strap, the outer end of the strap can be folded back upon itself, as at 31, after which its folded portion can be bent at an angle to the body portion of the strap to form an arm 32. The arm 32 is then struck out from the same upper and lower tongues 33 and 34, which are adapted to engage the threads of the attaching screw. This form is clearly shown in Figure 6 of the drawing, and, obviously, the arm 32 is adapted to be inserted within the bore of the hand-grip.

Figure 7:
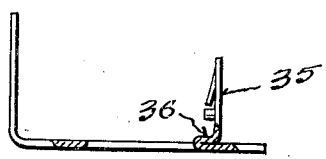
Figure 7 is a side elevation of a still further modified form of the bracket or strap.
Figure 8:
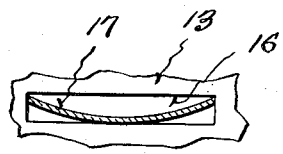
Figure 8 is an enlarged detail sectional view taken substantially on the line 8—8 of Figure 2, looking in the direction of the arrows, illustrating the means of associating the attaching clip with the bracket or strap of the type shown in Figures 1 to 4, inclusive.

Figure 7 shows a further modified form of the bracket, and in this form an arm 35 is struck out from the body portion of the bracket similar to the form shown in Figure 5, but in this form the arm is bent back, as at 36, against the body portion of the bracket to form a reinforcement therefor.

Obviously, the strap or bracket lies considerably below the point occupied by the usual lower holding-bolt, and wood bushing or sleeve. Hence, ample space is allowed for the user's hand around the hand-grip.

Changes in details may be made without departing from the spirit or the scope of this invention, but what I claim as new is:

1. A handle for cooking utensils comprising a wooden hand-grip having an axial bore opening out through its lower end and a radial opening communicating with the bore, an attaching bracket underlying the lower end of the hand-grip, an attaching foot formed on the inner end of the bracket for connection with the cooking utensil, the outer end of the bracket having a slot therein, a clip extending through the slot into the bore having thread-engaging tongues thereon, and a screw fitted in said opening engaging the tongues, said clip being of an arcuate shape in transverse cross section.

2. A handle for cooking utensils comprising, a hand grip having an axial bore opening out through its lower end, and a radial opening communicating with the bore and opening out one side of the handle, a flat attaching bracket completely underlying the lower end of the hand grip and closing the open end of the bore, means connecting the inner end of the bracket with the cooking utensil, the outer end of the bracket having a slot therein, a removable clip engaging the lower face of the bracket and extending through the slot and into the bore of the hand grip past the opening, and a screw fitted in said opening and threaded into the clip.

RAY H. FAY.